(12) United States Patent
Bai et al.

(10) Patent No.: US 8,264,792 B2
(45) Date of Patent: Sep. 11, 2012

(54) PMR WRITER DEVICE WITH MULTI-LEVEL TAPERED WRITE POLE

(75) Inventors: Zhigang Bai, Milpitas, CA (US); Kowang Liu, Fremont, CA (US); Yan Wu, Cupertino, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 581 days.

(21) Appl. No.: 12/387,534

(22) Filed: May 4, 2009

(65) Prior Publication Data

US 2010/0277832 A1 Nov. 4, 2010

(51) Int. Cl.
*G11B 5/31* (2006.01)

(52) U.S. Cl. .......... 360/125.15; 360/125.07; 360/125.12

(58) Field of Classification Search ............. 360/125.02, 360/125.03, 125.06, 125.07, 125.11, 125.12, 360/125.15

See application file for complete search history.

(56) References Cited

U.S. PATENT DOCUMENTS

| | | | |
|---|---|---|---|
| 4,441,131 A * | 4/1984 | Osanai ..................... | 360/125.04 |
| 5,600,519 A | 2/1997 | Heim et al. | |
| 7,133,252 B2 | 11/2006 | Takano et al. | |
| 7,322,095 B2 | 1/2008 | Guan et al. | |
| 2002/0080525 A1 * | 6/2002 | Sato et al. ..................... | 360/126 |
| 2005/0135005 A1 * | 6/2005 | Im ................................. | 360/125 |
| 2005/0219743 A1 | 10/2005 | Guan et al. | |
| 2005/0219744 A1 * | 10/2005 | Feldbaum et al. ............ | 360/126 |
| 2005/0237665 A1 | 10/2005 | Guan et al. | |
| 2008/0068748 A1 * | 3/2008 | Olson et al. .................. | 360/110 |
| 2008/0112082 A1 | 5/2008 | Guan et al. | |
| 2008/0316653 A1 | 12/2008 | Sasaki et al. | |
| 2009/0122445 A1 * | 5/2009 | Jiang et al. ............... | 360/123.12 |

* cited by examiner

*Primary Examiner* — Craig A. Renner

(74) *Attorney, Agent, or Firm* — Saile Ackerman LLC; Stephen B. Ackerman

(57) ABSTRACT

A perpendicular magnetic recording (PMR) head is fabricated with a multi-level tapered write pole for efficient channeling of magnetic flux. The write pole comprises a main pole with a tapered tip on which is formed at least one yoke that has a tapered edge. The edge of the yoke is recessed from the ABS of the tapered tip, giving the write pole a stepped profile. The tapered tip can be two sloped surfaces that are symmetric about a mid-plane of the main pole or a single sloped edge on the leading side or the trailing side of the pole. The yoke structure can consist of a single yoke formed on one side of the main pole or it can consist of two yokes formed symmetrically on both the leading and trailing sides of the main pole.

5 Claims, 6 Drawing Sheets

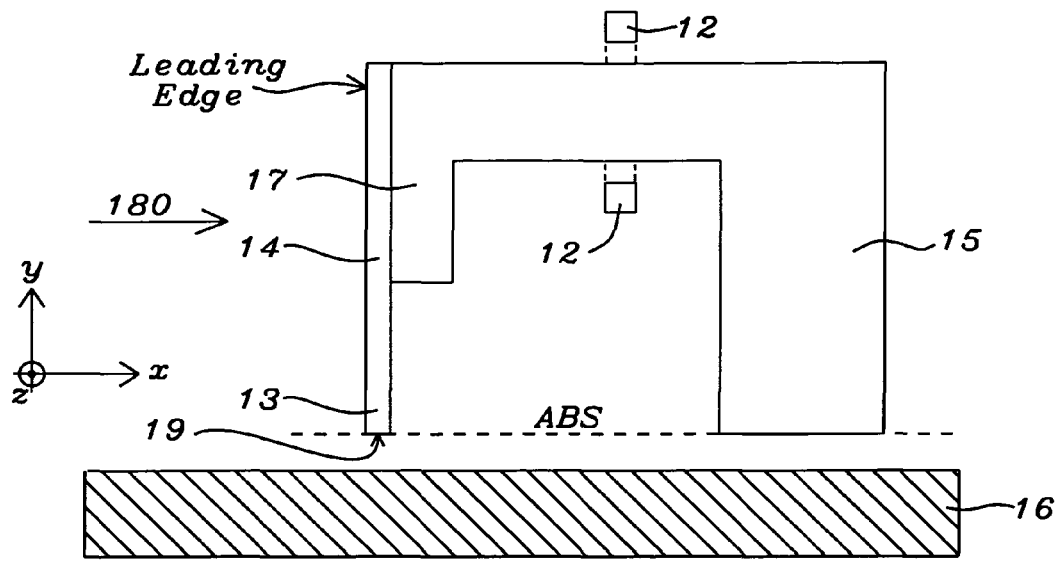
*FIG. 1a – Prior Art*
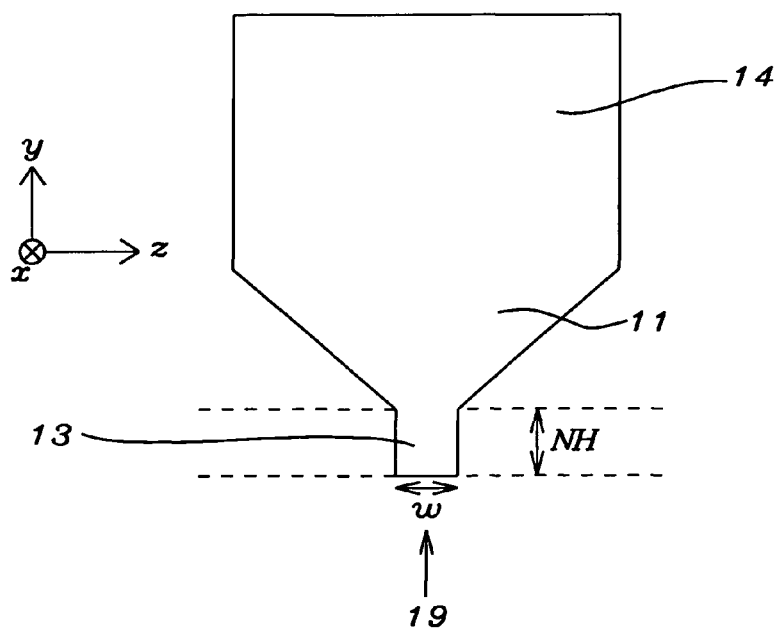
*FIG. 1b – Prior Art*

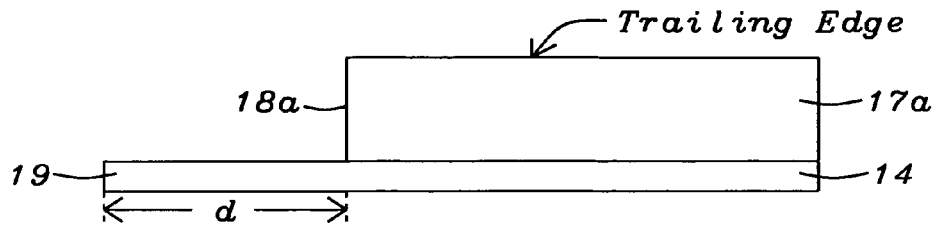
FIG. 2a – Prior Art
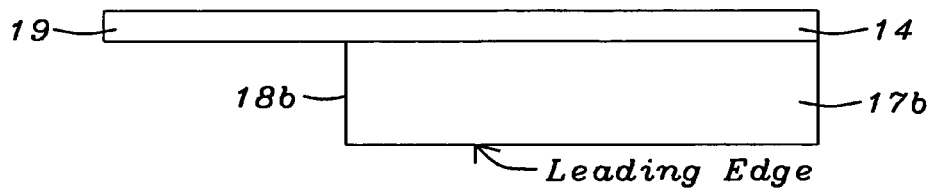
FIG. 2b – Prior Art
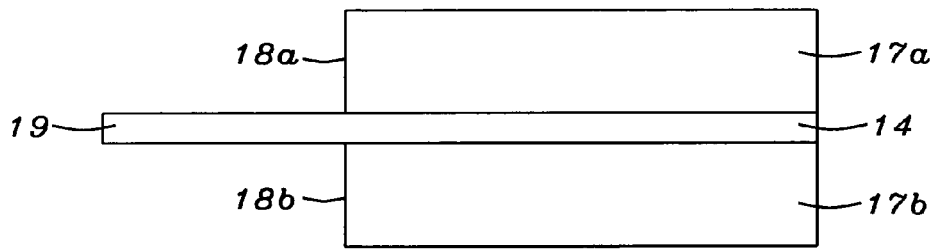
FIG. 2c – Prior Art
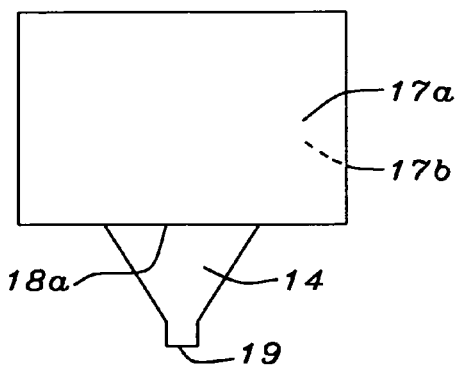
FIG. 2d – Prior Art

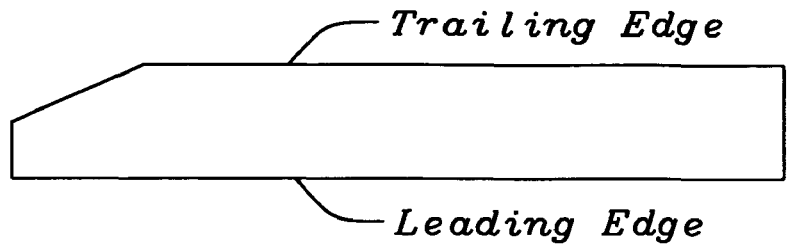
FIG. 3a - Prior Art
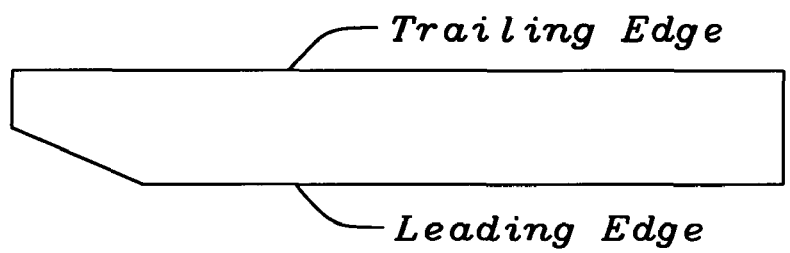
FIG. 3b - Prior Art
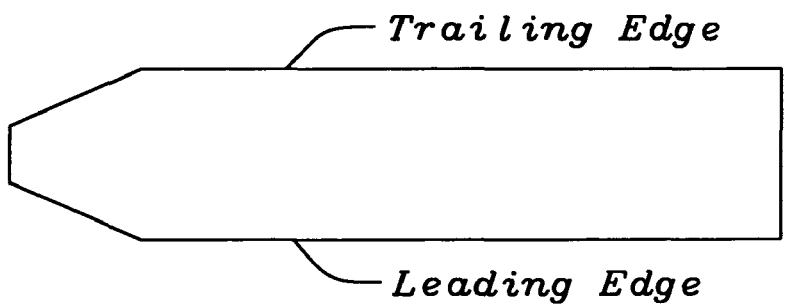
FIG. 3c - Prior Art

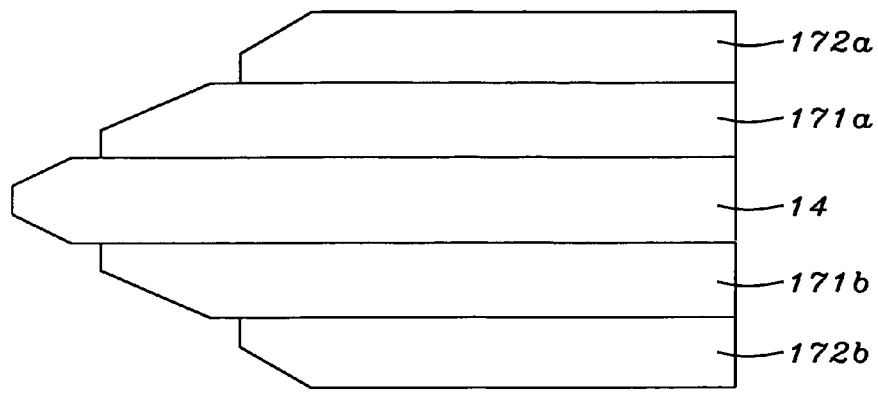
FIG. 8
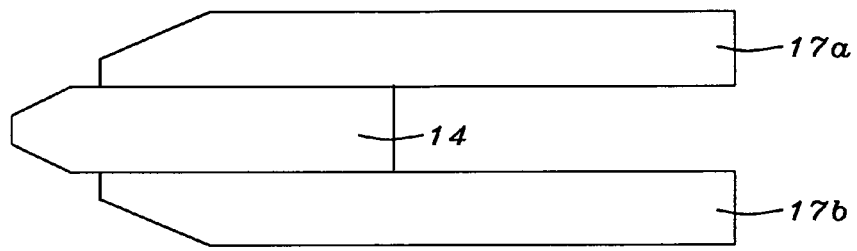
FIG. 9
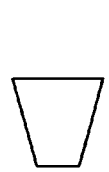   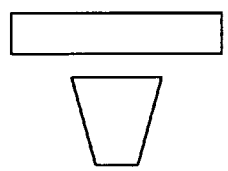
FIG. 10a            FIG. 10b
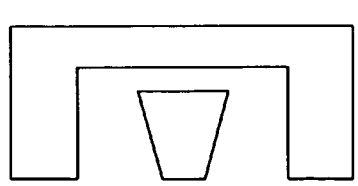   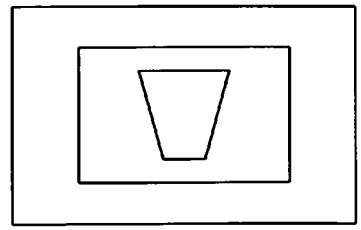
FIG. 10c            FIG. 10d

PMR WRITER DEVICE WITH MULTI-LEVEL TAPERED WRITE POLE

BACKGROUND OF THE INVENTION

1. Field of the Invention

This invention relates generally to magnetic recording heads, particularly to perpendicular recording heads that produce recording magnetic fields that are substantially perpendicular to the recording medium. More specifically, the invention relates to a tapered shape of a magnetic pole of a recording head that allows a more efficient delivery of a magnetic recording field to a recording medium.

2. Description of the Related Art

The increasing need for high recording area densities (up to 500 Gb/in$^2$) is making the perpendicular magnetic recording head (PMR head) a replacement of choice for the longitudinal magnetic recording head (LMR head).

By means of fringing magnetic fields that extend between two emerging pole pieces, longitudinal recording heads form small magnetic domains within the surface plane of the magnetic medium (hard disk). As recorded area densities increase, these domains must correspondingly decrease in size, eventually permitting destabilizing thermal effects to become stronger than the magnetic interactions that tend to stabilize the domain formations. This occurrence is the so-called superparamagnetic limit.

Recording media that accept perpendicular magnetic recording, allow domain structures within a magnetic layer to be formed with a perpendicular orientation relative to the disk surface, while a soft magnetic underlayer (SUL) formed beneath the magnetic layer acts as a stabilizing influence on these perpendicular domain structures and also serves to channel a return flux back to the head to strengthen the recording field. Thus, a magnetic recording head that produces a field capable of forming domains perpendicular to a disk surface, when used in conjunction with such perpendicular recording media, is able to produce a stable recording with a much higher area density than is possible using standard longitudinal recording.

Although the magnetic media used in conjunction with perpendicular writing are capable of storing a high area density, the write head itself must be able to produce magnetic fields of sufficient intensity and definition to make use of the media's capabilities. One approach to matching the writer capabilities to those of the media is to fabricate a tapered magnetic pole tip. Such a design presents a smaller footprint where it emerges at the ABS, yet delivers more flux. U.S. Pat. No. 7,322,095 and U.S. Patent Applications 2008/0112082 and 2005/0237665 (Guan et al.) show such a main pole tapered preferably at its trailing edge and shielded on four sides.

Traditionally, a top yoke (TY), a bottom yoke (BY) or both have been used in PMR writers to deliver flux to the main pole. As a consequence, these yokes are often referred to as auxiliary poles. Referring to FIGS. 1a-1b, there are shown the following prior art arrangements.

FIG. 1a shows a highly schematic diagram of a side view of a PMR single pole (14) writer positioned above a moving magnetic media (16). The media is moving in the direction of the arrow (180). The term "leading edge" (indicated in the figure by the legend "Leading Edge") of the writer or its various elements refers to the edge or surface into which the disk is moving. Typically, the read head, which is not shown here, would be formed on the leading edge side of the writer, so an area on the disk moves past the reader before passing beneath the writer. Where a figure does not indicate a disk or a reader, the notation of leading or trailing will be indicated by a legend. For consistency of description, a set of x, y, z axes define directions in this and remaining figures that display a PMR writer. The positive y-direction is away from the ABS of the writer. The x-direction defines the thickness direction of the pole layer (14) and the yoke layer (17) (i.e. the direction of layer formation by plating or the like). The positive z-direction (circle with a central dot) is out of the figure plane.

The main pole of this writer (14) consists of flared portion (11), which will be more clearly shown in FIG. 1b, and a narrow pole tip (13), which extends from the flared portion and presents an exposed ABS shape (19) just above the media (16). The writer has a return pole (15), that completes a magnetic flux loop (not shown), out from the main pole, through the media soft underlayer, back up through the return pole (15) and around through a bottom yoke (17) (formed beneath the pole) to which the pole tip is attached. A single exemplary current carrying coil winding (12) is shown as wrapped around the yoke (17) and represents the mechanism by which a magnetic field is generated. The ABS surface of the writer is indicated by the dashed line with the legend "ABS". The main pole (14), in this configuration, is mounted on the leading edge surface of the bottom yoke (17).

Referring next to FIG. 1b there is shown, schematically, a top view of the main pole (14) and pole tip (13), as it would appear if viewed along the thickness direction of the writer, or the arrow (180), or the x-axis of FIG. 1a. Note, as discussed above, that the main pole (14) generally has a horizontal shape that includes a small rectangular portion (13) and a triangular flaring portion (11). The pole tip projects from the narrow portion of (1). The ABS surface (19) of the pole tip (13) has a width, w, and the pole tip itself has neck height NH, defined by its length before the taper if the pole tip is reached.

Referring now to FIGS. 2a, 2b and 2c, there are shown three possible approaches to channeling magnetic flux from a yoke to a main pole, any of which could be applied to the configuration of FIG. 1a. In FIG. 2a, there is schematically shown the main pole (14) attached beneath the yoke (17a), which thereby acts as a top yoke. Typically, the distance, d, between the perpendicular edge of the yoke (18a) and the tip of the pole (19) is approximately 1.5 microns or greater.

In FIG. 2b, there is schematically shown the same main pole (14), with the yoke (17b) now serving as a bottom yoke and the same approximate 1.5 micron or greater distance between the yoke edge (18b) and the pole tip.

In FIG. 2c, there is shown a main pole configuration in which the main pole is sandwiched between a top (17a) and bottom (17b) yoke.

Referring finally to FIG. 2d, there is shown a top view of the configuration in FIG. 2c, in which the main pole (14) is shown projecting from between the top and bottom yokes (17a)/(17b). Note, this figure would appear substantially the same if it were used to illustrate the configurations of FIG. 2a or 2b, the difference being that only one yoke (17a) or (17b) would be seen.

Along with the above cited methods of attaching a pole tip to a top yoke, a bottom yoke or both, the tip itself may be provided with a tapering profile just above its emergence at the ABS of the writer. Referring to FIGS. 3a, 3b and 3c, there are shown three pole tips with trailing edge, leading edge and both leading and trailing edge, tapers. Note that a trailing (leading) taper refers to a bevel (reduction in thickness) that begins at the trailing (leading) edge face of the pole tip, a distance away from the ABS (shown as a dashed line) and produces a diminishing thickness towards the ABS face of the pole tip, at which point the bevel stops.

The methods by which the pole tip is tapered and the general design of the taper are also taught in the following patents and published applications.

U.S. Patent Application 2005/0219743 (Guan et al—Headway) discloses that the main pole may be tapered at the leading or the trailing edge.

U.S. Pat. No. 7,133,252 (Takano et al) shows that the main pole may be tapered at the leading edge or the trailing edge or both.

U.S. Pat. No. 5,600,519 (Heim et al) discloses a tapered pole tip.

U.S. Patent Application 2008/0316653 (Sasaki et al). FIG. 12 shows the pole tapered and the nonmagnetic layer 17 also tapered.

SUMMARY OF THE INVENTION

A first object of this invention is to provide a pole structure for a perpendicular magnetic recording (PMR) writer capable of recording at high area densities.

A second object of the present invention is to provide such a pole structure for a perpendicular magnetic recording head in which the write magnetic field is increased by means of more efficient provision of magnetic flux to the ABS of the pole tip.

A third object of the present invention is to provide a PMR writer with enhanced writing capabilities at narrow track widths.

A fourth object of the present invention is to provide a PMR writer with improved field gradient and other performance enhancements provided by improved writing capabilities.

A fifth object of the present invention is to provide such a PMR writer with a shielded pole structure so that writing to adjacent tracks is eliminated.

The objects of the present invention are realized by the formation of a write pole with multi-level tapering in the direction perpendicular to the air bearing surface (ABS). The taper is applied to both the pole tip (called the $1^{st}$ taper) and to the edges of the yoke structures, which can be above or below the pole tip, to which the pole tip is attached (called the $2^{nd}$ taper).

BRIEF DESCRIPTION OF THE DRAWINGS

FIG. 1a is a schematic representation of side view of an exemplary prior art PMR having a single main pole.

FIG. 1b is a schematic top view of the same PMR showing the shape of the main pole.

FIGS. 2a, 2b and 2c are prior art schematic representations showing exemplary main poles attached to top (2a), bottom (2b) and top and bottom (2c) yokes, so that the edges of the yokes are recessed from the pole tips.

FIG. 2d is a top view of any of the configurations in FIG. 2a, 2b or 2c.

FIGS. 3a, 3b and 3c show three prior art pole tips with tapers at their trailing, leading and leading and trailing sides.

FIG. 4b is a top view of the configuration in FIG. 4a.

FIG. 8 shows a schematic side cross-sectional view of a three-level tapered write pole.

FIG. 9 shows a schematic side cross-sectional view of a small double-level tapered main pole, partially sandwiched (stitched) between an upper yoke and a lower yoke.

FIGS. 10a-10d shows a view of the ABS surface the pole tip of any of the multi-level tapered main poles of the present invention, in an (a) unshielded configuration; (b) trailing edge shielded; (c) trailing edge and side shielded; (d) shielded on all four sides.

DESCRIPTION OF THE PREFERRED EMBODIMENTS

The preferred embodiment of the present invention is a multi-level tapered write pole structure for use within a perpendicular magnetic recording (PMR) head. A first level of the tapering (i.e. an increasing thickness in the layer produced by a bevel) begins at the ABS edge of the pole tip (this is called the $1^{st}$ taper) and extends in the positive y-direction (away from the ABS). The $1^{st}$ taper ends and the pole layer then retains a constant maximum thickness from that point backwards (i.e., away from the ABS). A second level of tapering begins at the edges of the upper and/or lower yoke structure ($2^{nd}$ taper) which contacts the pole tip on the constant thickness portion of either a top surface or a bottom surface and proceeds in the positive y-direction until the yoke layer attains a constant thickness.

Figure 4A:
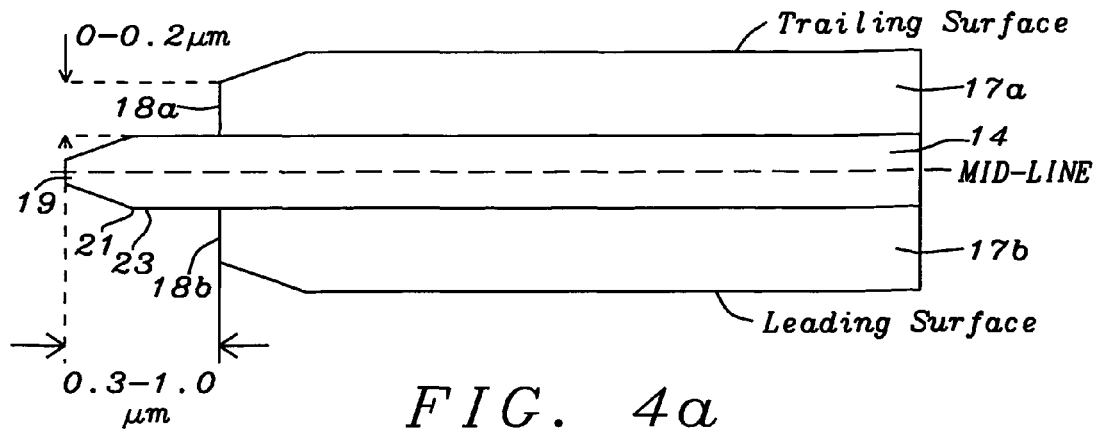
FIG. 4a is a schematic side cross-sectional illustration of an embodiment of the present invention showing a multi-level tapered main pole.

Referring to FIG. 4a, there is shown a schematic drawing of a side-view cross-section of a double-level tapered write pole that is a preferred embodiment of the present invention. In this embodiment, the main pole (14) is sandwiched between a top yoke (17a) and a bottom yoke (17b) that are formed conformally on the main pole on its trailing (top) and leading (bottom) surfaces respectively. The top yoke (17a) is formed on the top surface (trailing surface) of the main pole; the bottom yoke (17b) is formed on the bottom surface (leading surface) of the main pole. This particular configuration is reflection-symmetric about a z-y mid-plane passing through the mid-line (shown as a dashed line) of the main pole.

The taper of the main pole is defined by a region of symmetrically (about said z-y mid-plane) increasing thickness in the direction away from (i.e. in the positive y-direction defined in FIG. 1a)) the ABS end of the main pole (19). The taper terminates at a back edge (21), from which edge distally backwards, the main pole remains flat and horizontal and the thickness of the pole remains constant as the pole extends away from the ABS. Note, the direction away from the ABS of the pole tip may be referred to hereinafter, with equal accuracy, as the distal direction or the positive y-direction.

Figure 4B:
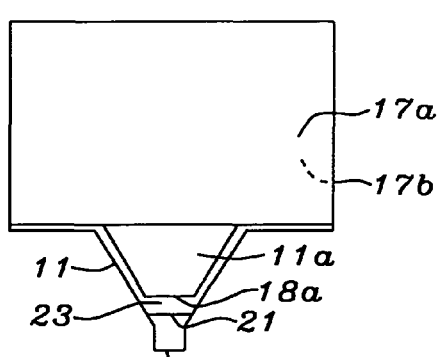

As is indicated in the drawing, the vertical front edges (18a), (18b), of the yokes have planar faces that are parallel to the ABS of the main pole (19) and that the second taper is formed as an upward sloping (beveled) surface extending distally from the planar edge face (18a) to the trailing surface of the top yoke and from the planar edge face (18b) of the bottom yoke (17b) downward to the leading surface of the bottom yoke. Note again that the taper of the top yoke slopes upward from edge (18b) towards its trailing surface, whereas the taper of the bottom yoke (17b) slopes downward towards its leading edge. The faces of these edges (18a)/(18b) are formed distally to the back edge (21) of the main pole taper and are recessed from the pole tip ABS (19) by an amount between approximately 0.3 and 1.0 microns. Thus, there is a short exposed flat portion (23) of the top and bottom surfaces of the main pole between the back edge of the $1^{st}$ taper (21) of the pole and the front edge of the $2^{nd}$ taper (18a), (18b) of the yokes. The height of the vertical faces of the front edges (18a), (18b) is between approximately 0 and 0.2 microns. The increasing thickness of the second taper in the distal (positive y) direction stops and the yoke maintains a substantially constant thickness thereafter. The thickness of the $2^{nd}$ taper region is between approximately 0.3 to 1.0 microns. The horizontal shape of the $2^{nd}$ taper region is conformal to the shape of the flaring portion of the main pole (14), which is generally a triangular shape as shown in FIG. 4b. The thickness of the combined layers is between approximately 0.5 and 3.0 microns and the material forming the layers is alloys of Fe and Co as is known in the art.

It is to be noted that the front edges of the $2^{nd}$ taper on the upper and lower yokes (18a), (18b) are much closer to the ABS than the top/bottom yokes of conventional PMR designs, which permits the delivery of more flux to the ABS of the pole tip (19). In addition, the conformal shape of the $2^{nd}$ tapered region to the main pole itself, produces a tapered front cross-sectional aspect which also helps to efficiently concentrate more flux to the pole tip ABS (19).

Referring to FIG. 4b, there is shown a top schematic view of the yoke and main pole as would be seen looking towards the trailing surface of the top yoke. The front edge of the $2^{nd}$ taper (18a) or (18b) is shown in outline as is the back edge of the $1^{st}$ taper (21). The triangular portion of the main pole (11) is conformally covered by the tapered portion top or bottom yoke (11a), if a single yoke is used, or by both yokes, if a sandwich configuration is constructed.

It is to be noted that fabrication of the pole structure can be understood with reference to FIG. 4b as described above. The fabrication can be easily accomplished using the masking process as for prior art designs with only slight modification of mask alignment to take into account the recessing of the yokes relative to the pole tip. In-plane alignment should not be difficult, however, because of the fact that the recessing (distance between (19) to (18a)) is at least 0.3 microns from the ABS, where 0.3 microns is the width of the pole.

Figure 5:
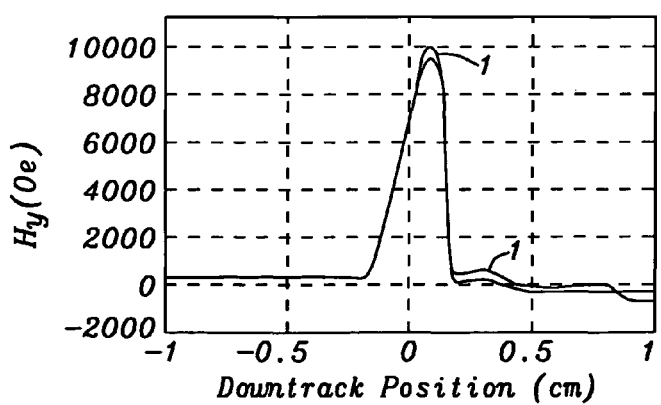
FIG. 5 is a graphical representation showing the on-track performance of a PMR using the double-level tapered main pole configuration of the current invention as compared with a reference PMR that is shielded and has a single level of tapering but lacks the double tapered configuration.

More specifically, a tapered bottom yoke (17b) can be created first by milling (via an ion beam etch, a RIE etch or the like) a sloped region in an AlOx substrate having a smooth planar surface, followed by plating or sputtering a yoke layer into the milled region and applying CMP to form a smooth planarized surface. After the pole (19) is formed on the planarized bottom yoke, a tapered top yoke (17a) can be formed on the pole by plating or sputtering a conventional (un-tapered) top yoke as defined in the prior art and then milling the front of the yoke to create the necessary taper. The pole is formed, also by plating or sputtering through a mask, onto the already planarized bottom yoke. Here, the mask is aligned over the bottom yoke to create the necessary recess of the yoke behind the tip of the pole. Once the pole is formed, the top yoke (17a) is formed, as noted above, on the pole, using a conventional mask that is properly aligned to create the required recess. Once the top yoke is formed and tapered, the pole tip can also be tapered, again using milling or RIE as the mechanism Referring to FIG. 5, there is shown a graphical comparison of the multi-level tapered main pole of the present invention as shown in FIGS. 4a and 4b with a reference writer using a single pole tip with trailing and leading edge tapers right at the ABS. The vertical axis measures magnetic field $H_y$ (Oe) into the magnetic medium and the horizontal axis measures downtrack position in cm.

The reference pole has only $1^{st}$ level tapering and lacks the tapered and recessed top and bottom yokes shown as (17a) and (17b) in FIG. 4a. As shown in the graphs, the curve representing the present invention (1) shows a significant improvement in peak $H_y$ by approximately 380 Oe or approximately 4%. It is to be noted that the significant improvement in field strength of the present invention might make it desirable to further optimize shield design, so that cross-track flux will be reduced.

Figure 6A:
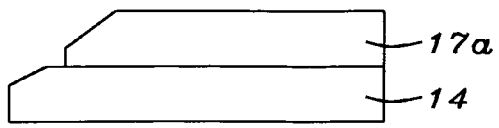
FIG. 6a-6f shows six schematic illustrations of side cross-sectional views of possible combinations of top yokes and bottom yokes with leading and trailing tapers, to which is attached a main pole with a tip having trailing and/or leading tapers.
Figure 6B:
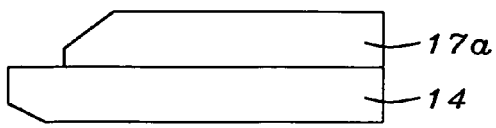
Figure 6C:
Figure 6D:
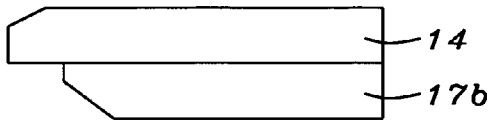
Figure 6E:
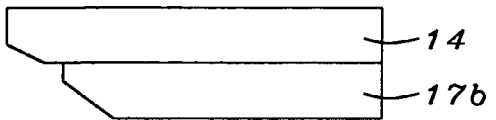
Figure 6F:
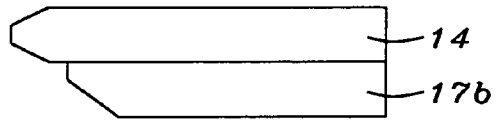

Referring now to FIGS. 6a-6f, there are shown six schematic cross-sectional side views of combinations of $1^{st}$ (pole) and $2^{nd}$ (yoke) tapers for a main pole (14) and an attached recessed top yoke (17a) or bottom yoke (17b) that could meet the objects of the present invention. In FIG. 6a both the $1^{st}$ and $2^{nd}$ tapers are trailing edge tapers. In FIG. 6b, they are, respectively, leading and trailing edge tapers. In FIG. 6c, they are, respectively, leading/trailing and trailing edge tapers. In FIG. 6d, they are trailing and leading edge tapers. In FIG. 6e, they are, respectively, leading, leading edge tapers and, finally, in FIG. 6f they are leading/trailing and leading edge tapers.

Figure 7A:
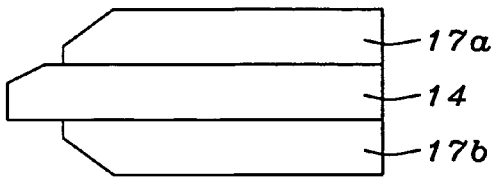
FIG. 7a-7c show three schematic illustrations of side cross-sectional views of a main pole having trailing, leading and both leading and trailing tapers, sandwiched between a top yoke with a leading taper and a bottom yoke having a trailing taper.
Figure 7B:
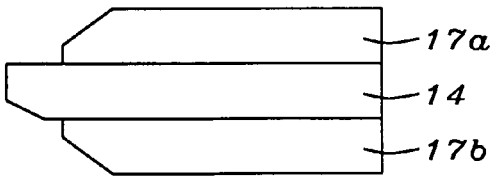
Figure 7C:
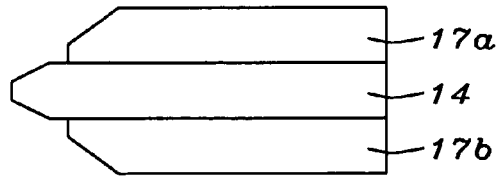

Referring now to FIGS. 7a-7c, there are shown three schematic cross-sectional side views of tapered poles (14), each formed between a top (17a) and bottom (17b) tapered yoke to provide $1^{st}$ and $2^{nd}$ tapers. Either of these three configurations could meet the objects of the present invention. In FIG. 7a the top yoke (17a) has a trailing edge taper, the bottom yoke (17b) has a leading edge taper and the main pole (14) has a trailing edge taper. In 7b, the top and bottom yokes are the same as in 7a, but the main pole (14) has a leading edge taper. Finally, the configuration of FIG. 7c has a main pole (14) with a symmetric leading/trailing edge taper.

Referring to FIG. 8, there is shown a 3-level tapered pole comprising a main pole (14) sandwiched between a first top and bottom yoke (171a), (171b), the entire configuration then being sandwiched between a second top and bottom yoke (172a), (172b). This 3-level tapered pole would also meet the objects of the present invention and is an alternative embodiment thereof.

Referring to FIG. 9, there is shown a stitched, 2-level main pole configuration in which a shortened main pole (14) is affixed between two yokes (17a) and (17b). Such a stitched configuration allows the formation of a short pole segment (14) which can be advantageous in that the shorter segment produces stable domain structures that persist during inactive periods when the write current is off. Such a structure would form another embodiment of the present invention.

Referring now to FIGS. 10a-10d, there are shown four views of the ABS of the pole tip of the present invention in different shielded configurations. FIG. 10a shows the pole tip unshielded. FIGS. 10b-10d show the pole tip surrounded respectively by a trailing shield (10b) a trailing shield and two side shields (10c) and a trailing shield, a leading shield and two side shields (10d). These embodiments are meant to illustrate the fact that shielded configurations of the multi-level tapered pole structure are possible using similar shield design technology of the prior art. It is to be noted, however, that the significantly increased flux produced by the multi-level tapered pole of this invention could very well require that shield dimensions be re-formulated to provide the protection against unwanted side writing at the new levels of write field intensity. Shield structures must be formed with sufficient volume and of proper magnetic moment materials so that they do not saturate under the influence of the strong writing fields produced by the present pole configurations. At present, however, the shield designs used in testing the present invention, such as used in generating the graphs of FIG. 4 have proven adequate.

As is understood by a person skilled in the art, the preferred embodiment of the present invention is illustrative of the present invention rather than limiting of the present invention. Revisions and modifications may be made to methods, materials, structures and dimensions employed in forming and providing a PMR head having a multi-level tapered main pole, while still forming and providing such a PMR head and pole and its method of formation in accord with the spirit and scope of the present invention as defined by the appended claims.

What is claimed is:

1. A PMR head comprising:
a main pole having a trailing edge surface and a leading edge surface and having a $1^{st}$ taper defined by a region of increasing pole thickness in a positive y-direction away from an ABS edge of said main pole, wherein said ABS edge is flat and wherein said taper terminates and said main pole has a region of constant pole thickness extending in said positive y-direction thereafter;
at least one tapered yoke having a $2^{nd}$ taper, wherein said at least one tapered yoke is formed conformally on said trailing or leading edge surface of said main pole, wherein said $2^{nd}$ taper is defined by a region of increasing yoke thickness of said yoke in said positive y-direction, said region of increasing yoke thickness beginning at a yoke edge closest to said ABS edge of said main pole and increasing in a direction away from said ABS edge until said region of increasing yoke thickness becomes a region of constant yoke thickness thereafter; and
wherein said yoke edge closest to said ABS edge of said main pole contacts said region of constant pole thickness of said main pole and is recessed a distance from said ABS edge.

2. The PMR head of claim 1 wherein said recess distance is between approximately 0.3 and 1.0 microns between said flat ABS edge of said main pole and said yoke edge closest to said ABS edge of said main pole.

3. The PMR head of claim 1 wherein said yoke edge closest to said ABS edge of said main pole is characterized by a face that is parallel to said ABS edge of said main pole and wherein said face extends perpendicularly from said main pole to a height greater than 0 to approximately 0.2 microns.

4. The PMR head of claim 1 wherein the at least one tapered yoke includes first and second tapered yokes, symmetrically disposed about a mid-plane of said main pole, wherein said first tapered yoke is formed on said trailing edge surface of said main pole and said second tapered yoke is formed on said leading edge surface of said main pole and wherein a $2^{nd}$ taper of said first tapered yoke is marked by a slope towards a trailing surface of said first tapered yoke and wherein a $2^{nd}$ taper of said second tapered yoke is marked by a slope towards a leading surface of said second tapered yoke.

5. The PMR head of claim 4 wherein said main pole is symmetrically tapered about a mid-plane of said main pole.

* * * * *